United States Patent Office 3,084,137
Patented Apr. 2, 1963

3,084,137
COMPOSITION COMPRISING EPOXIDIZED POLYBUTADIENE, POLYHYDRIC ALCOHOL, DICARBOXYLIC ANHYDRIDE, AND A DIALLYL ESTER
Gene Nowlin, Charles A. Heiberger, and Murray H. Reich, Princeton, N.J., assignors to FMC Corporation, a corporation of Delaware
No Drawing. Filed Jan. 19, 1960, Ser. No. 3,241
15 Claims. (Cl. 260—45.4)

This invention relates to novel thermosetting resinous compositions, and to thermoset resins obtained on curing epoxidized diene polymers with a new and improved curing system.

It is well known that various polymeric structures containing epoxy groups, wherein an oxygen atom bridges adjacent carbon atoms, may be cured by reacting these polymers, through their epoxy groups, with polyfunctional curing agents, to form cross-linked polymeric reaction products of very high molecular weight. It is also known that polymers and copolymers of butadiene and other dienes may be epoxidized, to form products which contain both epoxy groups and some residual unsaturation. The curing of these epoxidized dienes to form high molecular weight products has been the subject of much recent investigation. Each of the various types of curing agents which has been used to cure epoxy-containing resins offers certain advantages and, conversely, each may offer disadvantages in particular applications.

In patent application Serial No. 835,182, filed August 21, 1959, now Patent No. 3,073,796, is described a novel curing system for epoxidized dienes, wherein reaction with, typically, an unsaturated polycarboxylic anhydride, an aliphatic polyol and a free radical initiating agent produces thermoset epoxypolydienes of improved properties. It has now been discovered that thermoset epoxidized polydiene compositions having exceptional thermal stability and substantially enhanced chemical resistance and weatherability are obtained by reacting epoxidized diene polymers, particularly epoxypolybutadiene, with a curing composition comprising an unsaturated dicarboxylic anhydride having a polymerizable double bond, an aliphatic polyol, a free radical initiating agent, and a diallylic ester of a saturated or unsaturated carbocyclic dicarboxylic acid.

The base resin for the instant composition is preferably a liquid polymer or copolymer of butadiene which has been epoxidized. The polybutadiene itself may be prepared by any of a number of well known methods, such as emulsion or solution polymerization using a wide variety of catalysts, including free radical, alkali metal, Friedel-Crafts and organo-metallic catalysts. Best results are generally obtained with liquid polymers having a molecular weight below about 2500, corresponding to a viscosity below about 50 poises measured at zero shear and 25° C., since higher polymers are very viscous when epoxidized to a high epoxy content and thus not easily worked. When epoxidized to a low epoxy content, higher molecular weight polymers may of course be used. The lower limit of the molecular weight range for these polymers is about 100; that is, mixtures with dimers and trimers could actually be used, should they be desired to impart particular properties for special applications. In general, a convenient and preferred molecular weight range for the polybutadienes and copolymers is in the range of about 250 to 5000. Polymers outside of the molecular weight ranges described may also be used, but in the high molecular weight ranges and for solid polymers it is generally necessary to dissolve the polymer in a solvent before carrying out the epoxidation and curing, and for certain applications, such as in coatings, this procedure may actually be preferred. Useful techniques for the polymerization and copolymerization of butadiene are described in U.S. Patents 2,631,175 and 2,791,618.

For the epoxidation of the polybutadienes and copolymers thereof, standard epoxidation techniques may be used. Aliphatic, aromatic, and inorganic peracids, salts of the peracids, peroxides and hydroperoxides are the most common of the effective epoxidizing agents. For convenience, lower aliphatic peracids, such as performic, peracetic, perpropionic and perbutyric are preferred reagents. With these reagents, the epoxidation reaction may be carried out using a preformed peracid, or the peracid may be formed in the reaction medium, generally by adding hydrogen peroxide to an aliphatic acid or anhydride medium. Peracids may be prepared in any known way, such as is described in "Organic Syntheses," Coll. Volume I, Second Edition, John Wiley and Sons (1941), page 431. A number of epoxidation techniques for polybutadiene are illustrated in an article by C. W. Wheelock in Industrial and Engineering Chemistry 50, 299–304 (1958).

The epoxidation may be conducted using stoichiometric amounts of the peracid: that is, one mole of hydrogen peroxide or peracid per double bond in the polymer; or amounts below that theoretically required may be used. There is no significant advantage to using excess oxidant and, although the reactivity and properties of the epoxidized polybutadienes do vary with the degree of epoxidation, it has been found that the use of as little as 5% of the theoretical amount of peracid will produce useful resins. In general, the epoxidized polybutadienes used herein contain at least 1% by weight of epoxy oxygen, and it is preferred for most applications to employ epoxypolybutadienes having about 4 to 10% epoxy oxygen by weight. Epoxypolybutadienes containing more than 10% epoxy oxygen tend to be extremely viscous, especially in the higher molecular weight range; but this may actually be desired for special applications, such as coatings. As stated above, the viscosity of epoxypolybutadiene is increased by increasing the molecular weight of the base polymer or copolymer; and of course the viscosity of a particular epoxy resin may be lowered by the appropriate use of solvents, suitable solvents including such common organics as heptane, benzene and chloroform.

The curing formulation used herein consists of an unsaturated polycarboxylic anhydride having a polymerizable double bond, an aliphatic polyhydric alcohol, a free radical initiating agent, and a diallylic ester of a carbocyclic dicarboxylic acid. By appropriate selection of the particular component of each class, thermosetting compositions having a broad range of useful properties are obtained.

As the anhydride component of the curing agent, a wide variety of unsaturated polycarboxylic anhydrides containing reactive double bonds are effective in this system, used alone or in combination with each other or with saturated anhydrides. Typical reactive unsaturated anhydrides include maleic anhydride, monosubstituted maleic anhydrides such as chloromaleic and citraconic; itaconic, bicyclo-(2,2,1)-5-heptene-2,3-dicarboxylic, bicyclo - (2,2,1) - 5 - methyl - 5 - heptene - 2,3 - dicarboxylic anhydride; and many other unsaturated anhydrides having reactive double bonds, of varied structure and properties.

Excellent results are readily and economically obtained with maleic anhydride, used either alone or in combination with other aliphatic, alicyclic and aromatic polycarboxylic anhydrides, to prepare compositions having specific curing characteristics and cured properties. For example, compositions may be prepared where as much as 85% of the anhydride component consists of a saturated anhydride, or an anhydride containing relatively unreactive double bonds, since the presence of even 15% of reactive double bonds in the anhydride contributes to the improved properties of the product. Typical anhydrides in combination include succinic, dodecenylsuccinic, octenylsuccinic, di- and tetrachlorophthalic, tetrahydrophthalic, hexahydrophthalic, dichloromaleic, pyromellitic, bicyclo - (2,2,1) - 5-heptene-1,4,5,6,-7,7-hexachlor-2,2-dicarboxylic anhydride, and many others.

The aliphatic polyhydric alcohol component of the curing system may be a dihydric alcohol, as illustrated by the glycols and glycol ethers such as ethylene glycol, propylene glycol, triethylene glycol, dipropylene glycol, 1,4-butanediol, 2,3-butanediol, 1,6-hexanediol, 1,2-octanediol, cyclopentanediols, cyclohexanediols and long chain diols of straight and branched chains, which chains may contain aromatic rings, such as xylylene glycol and dimethylxylylene glycol. Higher polyols such as glycerol, 3 - methylolpentane-1,5-diol, tetrahydroxybutane, pentaerythritol, polypentaerythritol, polyallyl alcohol, dextrose, sorbitol, mannitol and trimethylolbenzene may also be used, as well as a large number of other dihydroxy and polyhydroxy compounds, used alone or as mixtures. Unsaturated polyols, such as 2-butene-1,4-diol, dihydroxycyclopentene and tetrahydroxycyclohexene may also be used. Substituents such as halogen, nitro, amino or other functional groups may be incorporated to impart particular properties to the product.

For best results, the amount of anhydride used should be at least equivalent to the amount of aliphatic polyol used. By equivalent amount is meant equivalent number of reactive groups; thus a simple anhydride contains two reactive groups, and a glycol contains two reactive groups. It is usually preferred to use excess anhydride equivalents over polyol equivalents for best results. When equivalent amounts of anhydride and polyol are used the rate of cure is lower, but may be accelerated with an acid catalyst. When excess polyol is used, a reasonable rate of cure may still be obtained by using an acid catalyst, but the properties of the products are in general inferior. With lower aliphatic glycols and aliphatic dicarboxylic anhydrides, it has been found that best results are generally obtained in the range of about 3 to 4 equivalents of anhydride per equivalent of glycol, although good results have also been obtained using a large excess of anhydride, and even at 9 or 10 excess anhydride equivalents improved products have resulted, at a very rapid reaction rate.

The total amount of combined anhydride plus polyol required for optimum properties in the cured epoxypolybutadiene composition depends both on the degree of epoxidation of the epoxypolybutadiene and on the particular curing combination used. In general, one epoxide equivalent of epoxypolybutadiene, that is, the amount of epoxypolybutadiene containing one atom of epoxy oxygen, requires a total amount of anhydride plus polyol containing at least one equivalent of reactive groups. As previously defined, a simple anhydride and a simple glycol each contains two reactive groups, and thus each contains two equivalents of reactive groups—a simple anhydride plus a simple glycol, combined, contain a total of four reactive groups. As the amount of total anhydride plus polyol used in the curing system is increased, the flexural strength, tensile strength, heat stability and other properties of the cured product are improved. Excellent results are obtained when a total of about 1.25 to 2.5 equivalents of total reactive groups in the polyol and anhydride are used per atom of epoxy oxygen in the epoxypolybutadiene, and useful products are obtained in the range of about 0.5 to over 4 equivalents of reactive groups in the curing agent per atom of epoxy oxygen.

The third essential component of the curing system is a diallylic ester of a carbocyclic dicarboxylic acid. The carbocyclic ring of the acid moiety may be a saturated ring, or contain one, two or three double bonds. Included in this type of structure are compounds having a methylene bridge, as well as other substituents such as alkyl or halogen. Double bonds such as those of the cyclohexene nucleus may be epoxidized for enhanced compatability and reactivity. The allyl groups may be substituted, typical allylic radicals including methallyl and chlorallyl. Representattive diallylic compounds useful herein include diallyl and dimethallyl ortho-, iso- and terephthalates, the corresponding dihydrophthalates, tetrahydrophthalates, and hexahydrophthalates, the endomethylene tetrahydro- and hexa-hydrophthalates, chloro- and allkyl-substituted phthalates, and epoxidized derivatives thereof.

Without intending to be limited to any particular curing mechanism, it appears as if the diallylic phthalate monomer copolymerizes with the unsaturated anhydride, and that this copolymerization is accompanied by interaction with the residual double bonds in the epoxypolybutadiene, to form a terpolymer based on addition polymerization, which polymerization occurs concurrently with condensation interaction among the anhydride, polyol and epoxy groups which are also present. Thus the amount of monomeric diallylic ester which is employed in the curing formulation depends somewhat on the degree of residual unsaturation in the particular polybutadiene base resin, and on the specific polymerization characteristics of the unsaturated anhydride. In general, about 5 to 40 parts of allylic monomer per 100 parts of epoxypolybutadiene may be used, with best results generally obtained in the range of 10 to 30 parts monomer per 100 parts epoxypolybutadiene. Minor amounts of other vinyl and allyl monomers may also be included in the formulation.

The fourth component of the curing formulation is a free radical initiating agent. This may be any agent which is stable below the curing temperature, but which liberates free radicals into the system under the curing conditions. The free radical initiators are those normally used in the catalysis of free radical polymerization reactions, most commonly peroxygen compounds, such as aliphatic, aromatic and inorganic peracids, salts and esters of the peracids, peroxides and hydroperoxides, but also including other types of free radical initiators, such as 2,2'-azo-bisisobutyronitrile. It is preferred herein to use organic peroxy compounds which are compatible with and soluble in the other components of the curing system. Examples of such peroxides include t-butyl perbenzoate, benzoyl peroxide, dicumyl peroxide, 2,5-bis-(tert.-butylperoxy)-2,5-dimethylhexane, di-t-butyl peroxide, p-methane hydroperoxide, pinane hydroperoxide, 2,5-dimethylhexane - 2,5-dihydroperoxide, cumene hydroperoxide, tert.-butyl hydroperoxide, and and many others. Peroxidated polybutadiene or epoxypolybutadiene may also be used as the catalyst.

The decomposition temperature of the free radical initiator is preferably in the range of about 75° to 200° C., since this is a convenient temperature range for obtaining completely cured products within a reasonable time. If curing is to be effected in two or more stages by progressively increasing the temperature, a combination of two or more appropriately selected free radical initiators may be used. The amount of free radical initiator used may vary over a wide range, and from 0.01 to 5% of peroxide, by weight of total curing agent (polyol, anhydride and diallylic ester), may be used. In general, excellent results are obtained in a preferred range of about 0.2 to 2% of peroxide. The decomposition of the peroxide may be promoted by the use of various well-known additives, typically acids or amines such as phosphoric acid, cobalt naphthenate, dimethyl aniline and boron trifluoride. The decomposition of the peroxide is, in fact, promoted during the curing step by acid formed during the reaction.

The components of the composition of this invention may be combined in any convenient way. Any two or more may be pre-mixed prior to blending into the resin which itself may contain one or more of the cure agents. Alternately one or more of the cure agents may be blended with the resin prior to addition of the remaining prescribed cure agents.

Care should be taken, however, if it is desired to use a polyol or anhydride or diallylic ester of high melting point in the curing system, since the necessary mixing temperature for homogeneity may substantially shorten the pot life of the combination. On the other hand, it has been found that the viscosity of the mixture is lowered as the curing agents are added, thereby permitting the use of larger amounts of curing agents, or those of higher molecular weights, while retaining the free-flowing properties of the composition. It is also possible to use solvents or diluents to lower the viscosity of the mixture and thus permit combination of components at lower temperatures.

The polyol may be mixed first with the epoxypolybutadiene, and the anhydride and diallylic ester then added to the mixture. To obtain a homogeneous mixture, it is convenient to melt the anhydride, and raise the temperature of the polyol/resin mixture enough to allow addition of the anhydride without precipitation. The temperature of the mix may then be lowered to room temperature, where gelation may or may not occur, depending on the curing agents used.

In alternative procedures, the anhydride may be added first to the base resin, followed by addition of the other components. However, since anhydrides alone react rapidly with these resins, additional precautions are necessary. As another alternative, the polyol and anhydride may be premixed before addition to the base resin containing the allylic ester. This procedure has been found to substantially increase the rate of cure of the resin. Thus, if a high rate of cure at elevated temperatures is desired, this procedure is followed. Premixing is most conveniently accomplished at the temperature at which both polyol and anhydride are liquid, and the liquid mixture is then added to the epoxypolybutadiene resin. Temperatures higher than necessary to obtain this liquid state should be avoided.

Mixing of the components should of course be carried out at a temperature below the decomposition point of the peroxide. In other words, the peroxide used in the curing formulation should be so selected that it does not decompose at the temperatures at which it is desired to prepare and, if necessary, store the composition before curing. The curing reaction is preferably carried out at low to moderate temperature, to facilitate control of the reaction rate, which increases with increased temperature. A useful procedure is to allow the composition to stand for a brief period at temperatures between about 0° C. and 75° C., and then to raise the temperature to about 100–200° C. to complete the reaction. Many variations in curing procedure are possible. The curing time varies with the starting materials and the curing temperature. In general, a reaction period of one to six hours at 100–200° C. is sufficient, although longer periods are sometimes required for maximum properties.

The products of this invention are useful in a variety of ways, as in potting and encapsulating of electronic assemblies and other casting applications, in laminates and in protective coatings and other resinous applications, either alone or in combination with other resins. They are particularly useful in applications requiring superior weatherability and chemical resistance. They may be combined with glass fibers or other reinforcing agents, with plasticizers, flexibilizers, fillers, extenders, pigments and dyes, and many other materials for specific applications.

Illustrated below are the preparation and properties of different types of epoxypolybutadienes useful in the practice of this invention. All parts are by weight unless otherwise indicated.

EPOXYPOLYBUTADIENE "A"

Butadiene was polymerized as follows: A dispersion of sodium in refined kerosene was prepared by agitating 100 parts of sodium, 100 parts of refined kerosene and one part of dimer acid for one hour at 105–110° C. in a homogenizer to produce sodium particles of 2–10 microns in size. About 4.3 parts of sodium as a 46% dispersion in kerosene and 162 parts of benzene were charged to an agitated reactor, the temperature was raised to 90° C., and 3.0 parts of technical grade butadiene was added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was a liquid polybutadiene, having an iodine number of 383, melt viscosity of 16.4 poises at 25° C. extrapolated to zero shear, and molecular weight of 980.

This polybutadiene was epoxidized as follows: About 100 parts of liquid polybutadiene, 100 parts of benzene, 41.6 parts of Dowex resin 50X–12 (a sulfonated styrene-divinylbenzene copolymer cross-linked with 12% divinylbenzene) and 16.2 parts of glacial acetic acid were heated with agitation to 60° C. About 70 parts of 50% hydrogen peroxide was then added, over a period of 3 hours. The temperature was maintained at 60° C. for an additional 2 hours, the mixture was cooled to 30° C., mixed with 123 parts of benzene and 26 parts of soda ash, and allowed to settle. The oily layer was separated and filtered. The filtrate was heated to 80° C. to remove the water azeotropically, and then stripped of benzene at 35° C. and 60 mm. Hg. The epoxypolybutadiene obtained as residue exhibited an iodine number of 176, an hydroxyl content of 1.6%, an epoxy oxygen content of 8.6% by weight and a melt viscosity of 980 poises extrapolated to zero shear at 25° C.

EPOXYPOLYBUTADIENE "B"

The polybutadiene prepared in "A" above was epoxidized as follows: About 100 parts of this polybutadiene, 100 parts of toluene, 41.6 parts of Dowex resin 50X–8 (a sulfonated styrene-divinylbenzene copolymer cross-linked with 8% divinylbenzene) and 16.2 parts of glacial acetic acid were charged to an agitated reaction flask, and heated to 60° C. About 70 parts of 50% hydrogen peroxide was added to the mixture over a period of 1.5 hours, at 60–70° C. Heating at 60–70° C. was continued for 15 hours, to increase the hydroxyl content and thereby increase the viscosity of the product. The mixture was then cooled to 25° C., filtered through fiber glass, and neutralized with about 25 parts of sodium carbonate. The oily layer was separated, and water was removed by azeotropic distillation with 125 parts of benzene, followed by removal of volatiles at 35° C. and 60 mm. Hg. The epoxypolybutadiene residue had an epoxy oxygen content of 9.3% by weight, an hydroxyl content of 4.1%, an iodine number of 154 and a melt viscosity of 9000 poises at 25° C. extrapolated to zero shear.

This invention is illustrated in the following examples, which include specific epoxypolybutadiene compositions as prepared and described above, and illustrate the curing of these compositions with typical cure agents. Physical properties were determined according to "ASTM Standards on Plastics (1958)." Heat distortion temperatures were determined according to ASTM method D648–56, Rockwell hardness according to ASTM method D785–51, flexural properties according to ASTM method D790–58T, tensile properties according to ASTM method D638–58T, and conditioning of specimens according to ASTM method D618–58. All parts are by weight.

Example 1

To 40 parts of epoxypolybutadiene "A" were added 12.0 parts of dimethyllyl isophthalate, 3.6 parts of 2,3-butylene glycol, 11.9 parts of maleic anhydride at 60° C. and 0.40 part dicumyl peroxide. The mixture was evacuated 15 minutes at 35° C., and poured into ½ x ½ x 6-inch bar molds. After a cure of two hours at 80° C., four hours at 115° C. and 24 hours at 155° C., the casting had heat distortion temperatures of 95° C. and 200° C. at deflections of 10 and 16 mils.

Example 2

To 40 parts of epoxypolybutadiene "A" were added 3.6 parts of 2,3-butylene glycol and 11 parts of dimethyllyl epoxyhexahydrophthalate. The mixture was warmed to 35° C. and 11.9 parts of maleic anhydride at 60° C. was added. After cooling to room temperature, 0.04 part of dicumyl peroxide dissolved in one part of dimethyllyl epoxyhexahydrophthalate was added. The blend was poured into ½ x ½ x 6-inch bar molds and cured for two hours at 80° C., four hours at 115° C. and 24 hours at 155° C. The cured casting exhibited heat distortion temperatures of 80° C., 113° C. and over 200° C. at corresponding deflections of 10, 20, and 26 mils.

Example 3

To 40 parts of epoxypolybutadiene "A" were added 12.0 parts of diallyl phthalate, 3.6 parts of 2,3-butylene glycol, 11.9 parts of maleic anhydride at 60° C., 0.40 part of dicumyl peroxide and 0.20 part of 2,5-bis(tert.-butylperoxy)-2,5-dimethylhexane. After curing in bar molds for two hours at 80° C., four hours at 115° C., and 24 hours at 155° C., the resin exhibited a heat distortion temperature of 168° C. at a deflection of 6.6 mils.

Example 4

To 30 parts of epoxypolybutadiene "B" were added 2.94 parts of 2,3-butylene glycol and 3.0 parts of diallyl phthalate. The mixture was warmed to 35° C. and 9.62 parts of maleic anhydride at 60° C. was added. After cooling the mixture to room temperature, 0.6 part of t-butyl perbenzoate was added, and the mixture was poured into a mold. After a cure of five hours at room temperature, two hours at 60° C. and 24 hours at 155° C., the casting exhibited heat distortion temperatures of 120° C., 181° C., and 200° C. at corresponding deflections of 10, 20, and 26 mils.

Example 5

A blend containing equal parts of epoxypolybutadiene "A" and epoxypolybutadiene "B" was prepared, and found to have an average epoxy oxygen content of 9.0% and a viscosity of 2600 poises extrapolated to zero shear at 25° C. To 40 parts of this blend was added 4.0 parts of diallyl phthalate, 3.6 parts of 2,3-butylene glycol, 11.9 parts of maleic anhydride at 60° C., and 0.5 part of tert.-butyl perbenzoate. The blend was poured into a suitable mold and cured for two hours at 80° C., four hours at 115° C., and 24 hours at 155° C. The casting had heat distortion temperatures of 120°, 181°, and 200° C. at deflections of 10, 20, and 40 mils. When the above blend was spread on 12 plies of 0.0085" thick long-shaft satin weave glass cloth having a vinyl silane finish, and cured for 3 minutes at 70° C., 9 minutes at 135° C. and 20 p.s.i., and 29 hours at 155° C., the resulting laminate had a flexural strength of 60,100 p.s.i., elongation of 1.9% and flexural modulus of 3,260,000 p.s.i.

Example 6

To 40 parts of the blend of epoxypolybutadiene "A" and "B" described in Example 5 were added 11.2 parts of diallyl phthalate and 3.2 parts of propylene glycol. After warming to 35° C., 12.4 parts of maleic anhydride at 60° C. was added, followed by 0.2 part benzoyl peroxide in 0.8 part of diallyl phthalate. The resulting blend was spread on 12 plies of glass cloth and cured for 9 minutes at 135° C. and 20 p.s.i., and 2 hours at 155° C. The resulting laminate had a flexural strength of 47,900 p.s.i., and flexural modulus of 3,040,000 p.s.i.

Example 7

To 100 parts of the blend of epoxypolybutadienes "A" and "B" described in Example 5 were added 8.4 parts of ethylene glycol and 8 parts of diallyl phthalate. The mixture was warmed to 35° C. and 41.2 parts of maleic anhydride at 60° C. was added. After cooling the mixture to room temperature, 0.5 part dicumyl peroxide in 2 parts of diallyl phthalate was added, and the mixture was poured into bar molds. After a cure cycle of two hours at room temperature, two hours at 40° C., and four hours at 115° C., the casting had a flexural strength of 13,500 p.s.i. and a flexural modulus of 390,000 p.s.i. After a post-cure of 24 hours at 155° C., the casting exhibited heat distortion temperatures of 193° C. at 10 mils deflection and 200° C. at 20 mils deflection.

Example 8

To 30 parts of the blend of epoxypolybutadienes "A" and "B" described in Example 5 were added 8.3 parts of diallyl epoxyhexahydrophthalate and 2.85 parts of 2,3-butylene glycol. After warming to 35° C., 9.25 parts of maleic anhydride at 60° C. was added, followed by 0.15 part of dicumyl peroxide in 0.7 part of the diallyl monomer, and 0.15 part of 2,5-bis-(tert.-butylperoxy)-2,5-dimethylhexane. After a cure in bar molds of two hours at 60° C., two hours at 115° C., and 24 hours at 155° C., the casting had heat distortion temperature values of 86°, 107°, and over 200° C. at deflections of 10, 20, and 40 mils.

It is apparent that this invention is susceptible to numerous modifications within the scope of the disclosure, and it is intended to include such variations within the scope of the following claims.

We claim:

1. A curable resin composition comprising an epoxidized polybutadiene containing polymerizable double bonds and at least 1% by weight of epoxy oxygen; about 0.5 to 4 equivalents per epoxy oxygen of, in combination, an aliphatic polyhydric alcohol, and a dicarboxylic anhydride containing a polymerizable double bond, said equivalents of alcohol and anhydride being calculated on the basis that one epoxy oxygen atom is equivalent to one hydroxyl and to one carboxyl group; 5 to 40 parts, per 100 parts of epoxidized polybutadiene, of a diallylic ester selected from the group consisting of diallyl, dimethallyl and dichlorallyl esters of carbocyclic dicarboxylic acids; and a catalytic amount of a free radical initiator.

2. The composition of claim 1, wherein said polyhydric alcohol is a lower alkylene glycol.

3. The composition of claim 1, wherein said anhydride is maleic anhydride.

4. The composition of claim 1, wherein said free radical initiator is an organic peroxide.

5. The composition of claim 1, wherein said free radical initiator decomposes at 75° C. to 200° C.

6. The composition of claim 1, wherein said diallylic ester is diallyl phthalate.

7. The composition of claim 1, wherein said diallylic ester is dimethallyl isophthalate.

8. The composition of claim 1, wherein said diallylic ester is diallyl epoxyhexahydrophthalate.

9. The composition of claim 1, wherein said diallylic ester is dimethallyl epoxyhexahydrophthalate.

10. A curable resin composition comprising an epoxidized polybutadiene containing polymerizable double bonds and 4% to 10% by weight of epoxy oxygen; about 1.5 to 2.5 equivalents per epoxy oxygen of, in combination, an aliphatic glycol having 2–6 carbon atoms and maleic anhydride, said equivalents of glycol and anhydride being calculated on the basis that one epoxy oxygen atom is equivalent to one hydroxyl and to one carboxyl group, said anhydride being present in excess equivalents over said glycol; 10 to 30 parts, per 100 parts of epoxidized polybutadiene, of diallyl phthalate; and a catalytic amount of an organic peroxide.

11. The method of curing an epoxypolybutadiene resin containing polymerizable double bonds and at least 1% by weight of epoxy oxygen, which comprises reacting said epoxypolybutadiene with about 0.5 to 4 equivalents per epoxy oxygen of, in combination, an aliphatic polyhydric alcohol, and a polycarboxylic anhydride containing a polymerizable double bond, said equivalents of alcohol and anhydride being calculated on the basis that one epoxy oxygen atom is equivalent to one hydroxyl and to one carboxyl group; 5 to 40 parts, per 100 parts of epoxypolybutadiene, of a diallylic ester selected from the group consisting of diallyl, dimethallyl and dichlorallyl esters of carbocyclic dicarboxylic acids; and a catalytic amount of a free radical initiator.

12. The method of curing an epoxypolybutadiene resin containing polymerizable double bonds and 4% to 10% by weight of epoxy oxygen, which comprises reacting said epoxypolybutadiene at a temperature of 75° to 200° C. with about 0.5 to 4 equivalents per epoxy oxygen of, in combination, an aliphatic glycol of 2–6 carbon atoms, and a dicarboxylic anhydride containing a polymerizable double bond, said equivalents of glycol and anhydride being calculated on the basis that one epoxy oxygen atom is equivalent to one hydroxyl and to one carboxyl group, said anhydride being present in excess equivalents over said glycol; 10 to 30 parts, per 100 parts of epoxidized polybutadiene, of diallyl phthalate; and a catalytic amount of an organic peroxide which decomposes in the range of 75° to 200° C.

13. The method of curing an epoxypolybutadiene resin containing polymerizable double bonds and at least 1% by weight of epoxy oxygen, which comprises reacting said epoxypolybutadiene at a temperature of 75° to 200° C. with 1.25 to 2.5 equivalents per epoxy oxygen, of, in combination, an aliphatic glycol having 2–6 carbon atoms and maleic anhydride, said equivalents of glycol and anhydride being calculated on the basis that one epoxy oxygen atom is equivalent to one hydroxyl and to one carboxyl group, said anhydride being present in excess equivalents over said glycol; 5 to 40 parts, per 100 parts of epoxypolybutadiene, of diallyl phthalate; and a catalytic amount of an organic peroxide which decomposes in the range of 75° to 200° C.

14. A thermoset resin composition comprising the reaction product of an epoxidized polybutadiene containing polymerizable double bonds and at least 1% by weight of epoxy oxygen; about 0.5 to 4 equivalents per epoxy oxygen of, in combination, an aliphatic polyhydric alcohol, and a dicarboxylic anhydride containing a polymerizable double bond, said equivalents of polyol and anhydride being calculated on the basis that one epoxy oxygen atom is equivalent to one hydroxyl and to one carboxyl group, said anhydride being present in excess equivalents over said polyol; 5 to 40 parts, per 100 parts of epoxidized polybutadiene, of a diallylic ester selected from the group consisting of diallyl, dimethallyl and dichlorallyl esters of carbocylic dicarboxylic acids; and a catalytic amount of a free radical initiator.

15. A thermoset resin composition comprising the reaction product of an epoxidized polybutadiene containing polymerizable double bonds and 4% to 10% by weight of epoxy oxygen; about 1.25 to 2.5 equivalents per epoxy oxygen of, in combination, an aliphatic glycol having about 2–6 carbon atoms and maleic anhydride, said equivalents of glycol and anhydride being calculated on the basis that one epoxy oxygen atom is equivalent to one hydroxyl and to one carboxyl group, said anhydride being present in excess equivalents over said glycol; 10 to 30 parts, per 100 parts of epoxidized polybutadiene, of diallyl phthalate; and a catalytic amount of an organic peroxide.

References Cited in the file of this patent

UNITED STATES PATENTS

| | | |
|---|---|---|
| 2,829,135 | Greenspan et al. | Apr. 1, 1958 |
| 2,848,433 | Eirich | Aug. 19, 1958 |
| 2,859,199 | Parker | Nov. 4, 1958 |
| 2,907,732 | Greenlee | Oct. 6, 1959 |
| 2,921,921 | Greenspan et al. | Jan. 19, 1960 |
| 2,947,717 | Belanger et al. | Aug. 2, 1960 |

UNITED STATES PATENT OFFICE
CERTIFICATE OF CORRECTION

Patent No. 3,084,137　　　　　　　　　　　　　April 2, 1963

Gene Nowlin et al.

It is hereby certified that error appears in the above numbered patent requiring correction and that the said Letters Patent should read as corrected below.

Column 4, line 7, for "Representattive" read -- Representative --; line 11, for "allkyl" read -- alkyl --; column 7, line 3, lines 14 and 15, and lines 18 and 19, for "dimethyllyl", each occurrence, read -- dimethallyl --.

Signed and sealed this 22nd day of October 1963.

(SEAL)
Attest:

ERNEST W. SWIDER
Attesting Officer

EDWIN L. REYNOLDS
Acting Commissioner of Patents